United States Patent
Wildes

(10) Patent No.: US 6,183,419 B1
(45) Date of Patent: *Feb. 6, 2001

(54) MULTIPLEXED ARRAY TRANSDUCERS WITH IMPROVED FAR-FIELD PERFORMANCE

(75) Inventor: Douglas Glenn Wildes, Ballston Lake, NY (US)

(73) Assignee: General Electric Company, Schenectady, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/241,670

(22) Filed: Feb. 1, 1999

(51) Int. Cl.[7] .................................................. A61B 8/00
(52) U.S. Cl. ......................................... 600/447; 73/626
(58) Field of Search ................................ 600/437, 443, 600/447, 459; 73/625–626; 367/7, 11, 103–105

(56) References Cited

U.S. PATENT DOCUMENTS

| | | | |
|---|---|---|---|
| 4,219,846 | * 8/1980 | Auphon | 73/626 |
| 4,641,660 | 2/1987 | Bele | 128/660 |
| 5,027,820 | 7/1991 | Pesque | 128/660.07 |
| 5,083,568 | 1/1992 | Shimazaki et al. | 128/662.03 |
| 5,186,175 | 2/1993 | Hirama et al. | 128/661.01 |
| 5,301,168 | 4/1994 | Miller | 367/138 |
| 5,329,930 | 7/1994 | Thomas, III et al. | 128/661.01 |
| 5,490,512 | 2/1996 | Kwon et al. | 128/661.01 |
| 5,520,186 | * 5/1996 | Deitrich | 600/447 X |
| 5,520,187 | * 5/1996 | Snyder | 600/447 X |
| 5,563,346 | * 10/1996 | Bartelt et al. | 600/447 X |
| 5,882,309 | * 3/1999 | Chiao et al. | 600/459 |
| 5,897,501 | * 4/1999 | Wildes et al. | 600/447 |
| 5,902,241 | * 5/1999 | Seyed-Bolonforosh et al. | 600/443 |
| 5,931,785 | * 8/1999 | Wildes | 600/459 |

* cited by examiner

*Primary Examiner*—Francis J. Jaworski
(74) *Attorney, Agent, or Firm*—Marvin Snyder; Douglas E. Stoner

(57) ABSTRACT

A multiplexer for connecting a beamformer to a multi-row transducer array, where the transducer array has more electrically independent elements than the beamformer has channels, enables dynamic selection and beamforming control of multi-row apertures. The multiplexer allows the active aperture to be scanned along at least one axis of the array and allows the shape of the active aperture to be varied electronically. The multiplexer supports transmit and receive apertures appropriate for synthetic aperture beamforming. The multiplexer is designed so that each system beamformer channel may be connected to a single transducer element for near-field imaging and to a pair of adjacent transducer elements for far-field imaging.

21 Claims, 15 Drawing Sheets

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| A |  | 12 |  | 14 | 9 | 9 | 11 | 11 |  | 4 |  | 6 |  | 8 |  | 10 | 5 | 5 | 7 | 7 |  | 0 |  | 2 |
|   | 12 | 13 | 14 | 15 | 0 | 1 | 2 | 3 | 4 | 5 | 6 | 7 | 8 | 9 | 10 | 11 | 12 | 13 | 14 | 15 | 0 | 1 | 2 | 3 |
| B | 4 | 5 | 6 | 7 | 8 | 9 | 10 | 11 | 12 | 13 | 14 | 15 | 0 | 1 | 2 | 3 | 4 | 5 | 6 | 7 | 8 | 9 | 10 | 11 |
|   | 5 |  | 7 |  | 9 | 0 | 11 | 2 | 13 | 4 | 15 | 6 | 1 | 8 | 3 | 10 | 5 | 12 | 7 | 14 | 9 |  | 11 |  |
|   | 12 | 13 | 14 | 15 | 0 | 1 | 2 | 3 | 4 | 5 | 6 | 7 | 8 | 9 | 10 | 11 | 12 | 13 | 14 | 15 | 0 | 1 | 2 | 3 |
| C |  | 12 |  | 14 | 9 | 9 | 11 | 11 |  | 4 |  | 6 |  | 8 |  | 10 | 5 | 5 | 7 | 7 |  | 0 |  | 2 |
|   | 12 | 13 | 14 | 15 | 0 | 1 | 2 | 3 | 4 | 5 | 6 | 7 | 8 | 9 | 10 | 11 | 12 | 13 | 14 | 15 | 0 | 1 | 2 | 3 |
| D |  |  |  |  |  |  |  |  |  |  |  |  |  |  |  |  |  |  |  |  |  |  |  |  |
| E |  |  |  |  |  |  |  |  |  |  |  |  |  |  |  |  |  |  |  |  |  |  |  |  |
| F |  |  |  |  |  |  |  |  |  |  |  |  |  |  |  |  |  |  |  |  |  |  |  |  |

*FIG. 4*

|   | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| A | 12 | 13 | 14 | 15 | 0 | 1 | 2 | 3 | 4 | 5 | 6 | 7 | 8 | 9 | 10 | 11 | 12 | 13 | 14 | 15 | 0 | 1 | 2 | 3 |
| B | 12 | 13 | 14 | 15 | 0 | 1 | 2 | 3 | 4 | 5 | 6 | 7 | 8 | 9 | 10 | 11 | 12 | 13 | 14 | 15 | 0 | 1 | 2 | 3 |
| C | 12 | 13 | 14 | 15 | 0 | 1 | 2 | 3 | 4 | 5 | 6 | 7 | 8 | 9 | 10 | 11 | 12 | 13 | 14 | 15 | 0 | 1 | 2 | 3 |
| D |   |   |   |   |   |   |   |   |   |   |   |   |   |   |   |   |   |   |   |   |   |   |   |   |
| E |   |   |   |   |   |   |   |   |   |   |   |   |   |   |   |   |   |   |   |   |   |   |   |   |
| F |   |   |   |   |   |   |   |   |   |   |   |   |   |   |   |   |   |   |   |   |   |   |   |   |

*FIG. 5*

|   | 0  | 1  | 2  | 3  | 4 | 5 | 6  | 7  | 8 | 9 | 10 | 11 | 12 | 13 | 14 | 15 | 16 | 17 | 18 | 19 | 20 | 21 | 22 | 23 |
|---|----|----|----|----|---|---|----|----|---|---|----|----|----|----|----|----|----|----|----|----|----|----|----|----|
| A |    |    |    |    | 9 | 9 | 11 | 11 |   | 4 |    | 6  |    | 8  |    |    | 10 | 5  | 5  | 7  | 7  |    |    |    |
|   | 12 | 13 | 14 | 15 |   |   |    |    | 4 |   | 6  |    | 8  |    | 10 |    |    |    |    |    |    | 0  | 1  | 2  | 3 |
| B |    |    |    |    |   | 9 |    | 11 |   |   |    |    |    |    |    |    |    | 5  |    | 7  |    |    |    |    |
|   |    |    |    |    | 9 |   | 11 |    |   | 4 |    | 6  |    | 8  |    | 10 | 5  |    | 7  |    |    |    |    |    |
|   | 12 | 13 | 14 | 15 |   |   |    |    | 4 |   | 6  |    | 8  |    | 10 |    |    |    |    |    |    | 0  | 1  | 2  | 3 |
| C |    |    |    |    | 9 | 9 | 11 | 11 |   | 4 |    | 6  |    | 8  |    |    | 10 | 5  | 5  | 7  | 7  |    |    |    |
|   | 12 | 13 | 14 | 15 |   |   |    |    | 4 |   | 6  |    | 8  |    | 10 |    |    |    |    |    |    | 0  | 1  | 2  | 3 |
| D |    |    |    |    |   |   |    |    |   |   |    |    |    |    |    |    |    |    |    |    |    |    |    |    |
| E |    |    |    |    |   |   |    |    |   |   |    |    |    |    |    |    |    |    |    |    |    |    |    |    |
| F |    |    |    |    |   |   |    |    |   |   |    |    |    |    |    |    |    |    |    |    |    |    |    |    |

*FIG. 6*

|   | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|----|----|----|----|----|----|----|----|----|----|----|----|----|----|
| A | 12 | 13 | 14 | 15 | 0 | 1 | 2 | 3 | 4 | 5 | 6 | 7 | 8 | 9 | 10 | 11 | 12 | 13 | 14 | 15 | 0 | 1 | 2 | 3 |
| B | 4 | 5 | 6 | 7 | 8 | 9 | 10 | 11 | 12 | 13 | 14 | 15 | 0 | 1 | 2 | 3 | 4 | 5 | 6 | 7 | 8 | 9 | 10 | 11 |
| C | 12 | 13 | 14 | 15 | 0 | 1 | 2 | 3 | 4 | 5 | 6 | 7 | 8 | 9 | 10 | 11 | 12 | 13 | 14 | 15 | 0 | 1 | 2 | 3 |
| D |   |   |   |   |   |   |   |   |   |   |    |    |    |    |    |    |    |    |    |    |    |    |    |    |
| E |   |   |   |   |   |   |   |   |   |   |    |    |    |    |    |    |    |    |    |    |    |    |    |    |
| F |   |   |   |   |   |   |   |   |   |   |    |    |    |    |    |    |    |    |    |    |    |    |    |    |

|   | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|----|----|----|----|----|----|----|----|----|----|----|----|----|----|
| A | 4<br>20 | 5<br>21 | 6<br>22 | 7<br>23 | 8<br>24 | 9<br>25 | 10<br>26 | 11<br>27 | 12<br>28 | 13<br>29 | 14<br>30 | 15<br>31 | 0 | 1 | 2 | 3 | 4 | 5 | 6 | 7 | 8 | 9 | 10 | 11 |
| B | 28<br>12 | 29<br>13 | 30<br>14 | 31<br>15 | 0<br>16 | 1<br>17 | 2<br>18 | 3<br>19 | 4<br>20 | 5<br>21 | 6<br>22 | 7<br>23 | 8<br>24 | 9<br>25 | 10<br>26 | 11<br>27 | 12<br>28 | 13<br>29 | 14<br>30 | 15<br>31 | 16<br>0 | 17<br>1 | 18<br>2 | 19<br>3 |
| C | 28 | 29 | 30 | 31 | 0<br>16 | 1<br>17 | 2<br>18 | 3<br>19 | 4<br>20 | 5<br>21 | 6<br>22 | 7<br>23 | 8<br>24 | 9<br>25 | 10<br>26 | 11<br>27 | 12<br>28 | 13<br>29 | 14<br>30 | 15<br>31 | 16 | 17 | 18 | 19 |
| D | 4 | 5 | 6 | 7 | 8 | 9 | 10 | 11 | 12 | 13 | 14 | 15 | 0<br>16 | 1<br>17 | 2<br>18 | 3<br>19 | 4<br>20 | 5<br>21 | 6<br>22 | 7<br>23 | 8<br>24 | 9<br>25 | 10<br>26 | 11<br>27 |
| E | 20<br>4 | 21<br>5 | 22<br>6 | 23<br>7 | 24<br>8 | 25<br>9 | 26<br>10 | 27<br>11 | 28<br>12 | 29<br>13 | 30<br>14 | 31<br>15 | 0<br>16 | 1<br>17 | 2<br>18 | 3<br>19 | 4<br>20 | 5<br>21 | 6<br>22 | 7<br>23 | 8<br>24 | 9<br>25 | 10<br>26 | 11<br>27 |
| F | 12<br>28 | 13<br>29 | 14<br>30 | 15<br>31 | 16 | 17 | 18 | 19 | 20 | 21 | 22 | 23 | 24 | 25 | 26 | 27 | 28 | 29 | 30 | 31 | 0 | 1<br>16 | 2<br>17 | 3<br>19 |

FIG. 9

|   | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|----|----|----|----|----|----|----|----|----|----|----|----|----|----|
| A | 4 | 5 | 6 | 7 | 8 | 9 | 10 | 11 | 12 | 13 | 14 | 15 | 0 | 1 | 2 | 3 | 4 | 5 | 6 | 7 | 8 | 9 | 10 | 11 |
| B | 28 | 29 | 30 | 31 | 16 | 17 | 18 | 19 | 20 | 21 | 22 | 23 | 24 | 25 | 26 | 27 | 28 | 29 | 30 | 31 | 16 | 17 | 18 | 19 |
| C | 28 | 29 | 30 | 31 | 16 | 17 | 18 | 19 | 20 | 21 | 22 | 23 | 24 | 25 | 26 | 27 | 28 | 29 | 30 | 31 | 16 | 17 | 18 | 19 |
| D | 4 | 5 | 6 | 7 | 8 | 9 | 10 | 11 | 12 | 13 | 14 | 15 | 0 | 1 | 2 | 3 | 4 | 5 | 6 | 7 | 8 | 9 | 10 | 11 |
| E | 4 | 5 | 6 | 7 | 8 | 9 | 10 | 11 | 12 | 13 | 14 | 15 | 0 | 1 | 2 | 3 | 4 | 5 | 6 | 7 | 8 | 9 | 10 | 11 |
| F | 28 | 29 | 30 | 31 | 16 | 17 | 18 | 19 | 20 | 21 | 22 | 23 | 24 | 25 | 26 | 27 | 28 | 29 | 30 | 31 | 16 | 17 | 18 | 19 |

FIG. 10

|   | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|----|----|----|----|----|----|----|----|----|----|----|----|----|----|
| A | 4<br>20 | 21 | 22 | 23 | 24 | 25 | 26 | 27 | 28 | 13<br>29 | 14<br>30 | 15<br>31 | 0 | 1 | 2 | 3 | 4 | 5 | 6 | 7 | 8 | 9 | 10 | 11 |
| B | 28<br>12 | 13 | 14 | 15 | 16 | 17 | 18 | 19 | 20 | 5<br>21 | 6<br>22 | 7<br>23 | 8<br>24 | 9<br>25 | 10<br>26 | 11<br>27 | 12<br>28 | 13<br>29 | 14<br>30 | 15<br>31 | 16<br>0 | 17<br>1 | 18<br>2 | 19<br>3 |
| C | 28 | 29 | 30 | 31 | 0 | 1 | 2 | 3 | 4 | 5<br>21 | 6<br>22 | 7<br>23 | 8<br>24 | 9<br>25 | 10<br>26 | 11 | 12 | 13 | 14 | 15 | 16 | 17 | 18 | 19 |
| D | | | | | 4 | 5 | 6 | 7 | 8 | 9 | 10 | 11 | 12<br>13 | 14 | 15 | 0 | 1 | 2 | 3 | 4 | 5 | 6 | 7 | 8 | 9 | 10 | 11<br>27 |
| E | 20<br>4 | 21<br>5 | 22<br>6 | 23<br>7 | 24<br>8 | 25<br>9 | 26<br>10 | 27<br>11 | 28<br>12 | 29<br>13 | 30<br>14 | 31<br>15 | 16 | 17 | 18 | 19 | 20 | 21 | 22 | 23 | 24 | 25 | 26 | 11<br>27 |
| F | 12<br>28 | 13<br>29 | 14<br>30 | 15<br>31 | 16 | 17 | 18 | 19 | 20 | 21 | 22 | 23 | 24 | 25 | 26 | 27 | 28 | 29 | 30 | 31 | 0 | 1<br>17 | 2<br>18 | 3<br>19 |

*FIG. 11*

|   | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|----|----|----|----|----|----|----|----|----|----|----|----|----|----|
| A | 4<br>20 | 21 | 22 | 23 | 24 | 25 | 26 | 27 | 28 | 13<br>29 | 14<br>30 | 15<br>31 | 0 | 1 | 2 | 3 | 4 | 5 | 6 | 7 | 8 | 9 | 10 | 11 |
| B | 28<br>12 | 29 | 30 | 31 | 0 | 1 | 2 | 3 | 4 | 5<br>21 | 6<br>22 | 7<br>23 | 8<br>24 | 9 | 10 | 11 | 12 | 13 | 14 | 15 | 16 | 17 | 18 | 19<br>3 |
| C | 28 | 29 | 30 | 31 | 0 | 1 | 2 | 3 | 4 | 5<br>21 | 6<br>22 | 7<br>23 | 8<br>24 | 9 | 10 | 11 | 12 | 13 | 14 | 15 | 16 | 17 | 18 | 19 |
| D | 4 | 5 | 6 | 7 | 8 | 9 | 10 | 11 | 12 | 13 | 14 | 15 | 0<br>16 | 1 | 2 | | | 19 | 20 | 21 | 22 | 23 | 24 | 11<br>27 |
| E | 20<br>4 | 5 | 6 | 7 | 8 | 9 | 10 | 11 | 12 | 29<br>13 | 30<br>14 | 31<br>15 | 0<br>16 | 1 | 2 | | | 19 | 20 | 21 | 22 | 23 | 24 | 25 26 11 27 |
| F | 12<br>28 | 13 | 14 | 15 | 16 | 17 | 18 | 19 | 20 | 21 | 22 | 23 | 24 | 25 | 26 | 27 | 28 | 29 | 30 | 31 | 0 | 1<br>17 | 2<br>18 | 3<br>19 |

*FIG. 12*

|   | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| A | 4 | 5 | 6 | 7 | 8 | 9 | 10 | 11 | 12 | | | | | | | | | | | | | | | |
|   | 20 | 21 | 22 | 23 | | | | | | 29 | 30 | 31 | 0 | 1 | 2 | 3 | 4 | 5 | 6 | 7 | 8 | 9 | 10 | 11 |
| B | | | | | 0 | 1 | 2 | 3 | 4 | 5 | 6 | 7 | 8 | 9 | 10 | | | 13 | 14 | 15 | | | | |
|   | 12 | 13 | 14 | 15 | | | | | | | | | | | | | 27 | 28 | | | 0 | 1 | 2 | 3 |
| C | 28 | 29 | 30 | 31 | | | | | | 5 | 6 | | | | | | | 13 | 14 | 15 | 16 | 17 | 18 | 19 |
|   | | | | | 16 | 17 | 18 | | | 21 | 22 | 23 | 24 | 25 | 26 | 27 | 28 | | | | | | | |
| D | | | | | | | | | | | | | | | | | | 5 | 6 | 7 | 8 | 9 | 10 | 11 |
|   | 4 | 5 | 6 | 7 | 8 | 9 | 10 | 11 | 12 | 13 | 14 | 15 | 16 | 17 | 18 | 19 | 20 | | | | | | | |
| E | 20 | 21 | 22 | 23 | 24 | 25 | 26 | | | 29 | 30 | 31 | 0 | 1 | 2 | | | | | | | | | |
|   | | | | | | | | 11 | 12 | | | | | | | | | 19 | 20 | 21 | 22 | 23 | 24 | 25 | 26 | 27 |
| F | 12 | 13 | 14 | 15 | 16 | 17 | 18 | 19 | 20 | 21 | 22 | 23 | 24 | 25 | 26 | 27 | 28 | 29 | 30 | 31 | 0 | 1 | 2 | 3 |
|   | 28 | 29 | 30 | 31 | | | | | | | | | | | | | | | | | 16 | 17 | 18 | 19 |

*FIG. 13*

MULTIPLEXED ARRAY TRANSDUCERS WITH IMPROVED FAR-FIELD PERFORMANCE

The Government of the United States of America has rights in this invention in accordance with Contract No. N00014-96-C-0189 awarded by the Department of the Navy.

FIELD OF THE INVENTION

This invention relates to medical ultrasound imaging systems having multi-row ultrasound transducer arrays. In particular, the invention relates to multi-row ultrasound transducer arrays having a number of elements greater than the number of beamformer channels.

BACKGROUND OF THE INVENTION

A conventional ultrasound imaging system comprises an array of ultrasonic transducers which are used to transmit an ultrasound beam and to receive the reflected beam from the object being studied. For ultrasound imaging, a one-dimensional array typically comprises a multiplicity of transducers arranged in a line and driven with separate voltages. By selecting the time delay (or phase) and amplitude of the applied voltages, the individual transducers can be controlled to produce ultrasonic waves which combine to form a net ultrasonic wave that travels along a preferred vector direction and is focused at a selected point along the beam. Multiple firings may be used to acquire data along the same scan line. The beamforming parameters of each of the firings may be varied to provide a change in maximum focus or otherwise change the content of the received data for each firing, e.g., by transmitting successive beams along the same scan line with the focal point of each beam being shifted relative to the focal point of the previous beam. By changing the time delay and amplitude of the applied voltages, the beam with its focal point can be moved in a plane to scan the object.

The same principles apply when the transducer array is employed to receive the reflected sound (receiver mode). The voltages produced at the receiving transducers are summed so that the net signal is indicative of the ultrasound reflected from a single focal point in the object. As with the transmission mode, this focused reception of the ultrasonic energy is achieved by imparting a separate time delay (and/or phase shift) and gain to the signal from each receiving transducer.

A phased-array ultrasound transducer consists of an array of small piezoelectric elements, with an independent electrical connection to each element. In most conventional transducers the elements are arranged in a single row, spaced at a fine pitch (one-half to one acoustic wavelength on center). As used herein, the term "1D" transducer array refers to a single-row transducer array having an elevation aperture which is fixed and an elevation focus which is at a fixed range. Electronic circuitry coupled to the elements uses time delays and possibly phase rotations to control the transmitted and received signals and form ultrasound beams which are steered and focused throughout the imaging plane. For some ultrasound systems and probes, the number of transducer elements in the probe exceeds the number of channels of beamformer electronics in the system. In these situations an electronic multiplexer is used to dynamically connect the available channels to different (typically contiguous) subsets of the transducer elements during different portions of the image formation process.

Various types of multi-row transducer arrays, including so-called "1.25D", "1.5D", "1.75D" and "2D" arrays, have been developed to improve upon the limited elevation performance of 1D arrays. As used herein, these terms have the following meanings: 1.25D) elevation aperture is variable, but focusing remains static; 1.5D) elevation aperture, shading, and focusing are dynamically variable, but symmetric about the centerline of the array; 1.75D) elevation geometry and control are similar to 1.5D, but without the symmetry constraint; and 2D) elevation geometry and performance are comparable to azimuth, with full electronic apodization, focusing and steering. The elevation aperture of a 1.25D probe increases with range, but the elevation focusing of that aperture is static and determined principally by a mechanical lens with a fixed focus (or foci). 1.25D probes can provide substantially better near-and far-field slice thickness performance than 1D probes, and require no additional system beamformer channels. 1.5D probes use additional beamformer channels to provide dynamic focusing and apodization in elevation. 1.5D probes can provide detail resolution comparable to, and contrast resolution substantially better than, 1.25D probes, particularly in the mid-and far-field. 1.75D probes, with independent control of the beamforming time delays for all elements in the aperture, allow the beamformer to adaptively compensate for inhomogeneous propagation velocities in the body (or nonuniformities in the imaging system or transducer). In addition to such adaptive beamforming or phase aberration correction, 1.75D probes may also support limited beam steering in the elevation direction.

By providing at least apodization (1.25D) and possibly dynamic beamforming (1.5D), phase aberration control (1.75D), or full 2D beam steering, multi-row transducer arrays significantly improve upon the limited elevation performance of 1D probes. However, as the number of elements in the transducer increases, the number of channels in the beamformer does not keep pace, and the function of the multiplexer becomes increasingly important.

U.S. Pat. No. 5,520,187, issued to Snyder, the disclosure of which is incorporated by reference herein, does not discuss multi-row transducer arrays, but describes a flexible multiplexer which supports different multiplexer states for systems with different numbers of beamformer channels. The multiplexer states can be reprogrammed by the ultrasound imaging system, e.g., via a serial interface. These features are advantageously used in multi-row array multiplexers such as those disclosed hereinbelow.

U.S. Pat. No. 5,329,930, issued Jul. 19, 1994 to Thomas and Harsh and assigned to the instant assignee, the disclosure of which is incorporated by reference herein, discloses a method of synthetic aperture imaging, whereby a finite number of system beamformer channels are coupled via a multiplexer to successive subsets of a large number of transducer elements. For each desired image vector and for each subset of the transducer elements, an acoustic beam is transmitted, received and summed coherently with the acoustic data from the other subsets of the transducer elements. In this way an N-channel beamformer can achieve most of the resolution and signal-to-noise performance available from an (M×N)-element transducer, albeit at the cost of M transmit-receive cycles per resulting image vector (hence the name 1-for-M or 1:M imaging). Thomas and Harsh discuss criteria for the multiplexer but do not disclose any specific design for it. The multiplexer disclosed hereinbelow satisfies the criteria of U.S. Pat. No. 5,329,930 and is designed to support 1:M beamforming of 1.5D and 1.75D transducer arrays.

D.G. Wildes et al. U.S. Pat. No. 5,897,501, filed on Feb. 20, 1998 and assigned to the instant assignee, discloses multiplexers for 1D transducer arrays and also discloses design rules and a physical design for a new class of multiplexers which allow flexible control of aperture shape and beamformer connectivity for multi-row transducer arrays. The connections between system channels and transducer elements obey the following design rules:

Rule I. The order and cycle length of the channel to element assignments is the same for all rows.

Rule II. The rows of the aperture are grouped in pairs. Channel assignments in one row of each pair are offset from the assignments in the other row by one-half the cycle length.

Rule III. Pairs of rows may also be grouped in quads. Channel assignments in one pair of each quad are offset from the assignments in the other pair by one-quarter of the cycle length.

Rule IV. If any element is coupled through switches to two channels, then the two channels coupled to that element are one-half the cycle length apart.

All of the 1D and 1.25D apertures shown in U.S. Pat. No. 5,897,501 have a separate system beamformer channel (or pair of channels) assigned to each column of transducer elements, so that the maximum width of the active aperture is limited by the number of system channels. Similarly, the 1.5D and 1.75D apertures have a separate system beamformer channel connected to each transducer element (or elevation-symmetric pair of elements, for the 1.5D arrays), so that the total area of the active aperture is limited by the number of system channels.

M.S. Seyed-Bolorforosh et al. U.S. Pat. No. 5,902,241, filed on Nov. 24, 1997 and assigned to the instant assignee, discloses an adaptive transducer array in which the element pitch is controlled by the imaging system depending on the mode of operation. Aperture size is increased by increasing the pitch of a row of transducer elements. In the case of a multi-row transducer array, the pitch can be increased in more than one row. A multiplicity of transducer elements are coupled to a multiplicity of beamformer channels by a multiplexing arrangement having multiple states. In one multiplexer state, successive transducer elements are respectively coupled to successive beamformer channels to produce an aperture having an element pitch equal to the distance separating the centerlines of two adjacent transducer elements (hereinafter "small pitch"). In another multiplexer state, selected transducer elements are respectively coupled to successive beamformer channels to produce an aperture having an increased element pitch equal to the small pitch multiplied by a factor of two or more. Three techniques to increase the aperture are disclosed. Methods of applying the invention in U.S. Pat. No. 5,902,241 to 1.25D, 1.5D and 2D arrays are discussed. The preferred method is to interconnect the adjacent elements in an array in order to form a larger active aperture by increasing the pitch. Alternatively, every other element in an array could be coupled to a respective beamformer channel to form a sparse array having a larger aperture. The last method is a combination of these two techniques wherein the active aperture is divided into a number of segments, each segment comprising a region with small pitch, a region with larger pitch obtained by shorting adjacent elements together, or a region with larger pitch obtained with sparse spacing of elements.

Ultrasound transducers are divided into fine-pitch arrays of elements so that an independent, electronically controlled time delay can be applied to the signal to or from each element. The algebraic sum of those signals forms an electronically steered and focused beam of ultrasound. If the transducer is a so-called linear or convex array and the beam of ultrasound is directed perpendicular to the face of the transducer without steering, then the time delays necessary for focusing are approximately:

$$\Delta t(r) \approx \frac{r^2}{2FV_s} \tag{1}$$

where r is the distance from the beam center to points on the face of the transducer, F is the focal length, and $V_s$ is the speed of sound. The resolution at the focus is:

$$\delta \approx \lambda f \tag{2}$$

where $\lambda$ is the wavelength of the ultrasound and $f$ is the f-number of the array.

To maintain relatively uniform resolution over the image, the active aperture of the transducer array is increased proportional to the focal distance, maintaining a constant f-number, typically $f/1$ to $f/2$ in azimuth. The minimum f-number used is constrained by the desired depth of field and by the time-delay resolution of the beamformer. In the far-field of the image, however, the active aperture of the array is typically constrained by the number of channels in the system beamformer, and the f-number increases and resolution decreases with depth. A major decision in the design of a transducer array is how to trade-off between fine pitch, for broad directivity of individual elements and good control of time delays for low f-number beamforming in the near-field and mid-field, and coarse pitch, for maximum aperture, sensitivity and resolution in the far-field.

SUMMARY OF THE INVENTION

A multiplexer is used for coupling a beamformer to a multi-row array transducer, where the transducer has more electrically independent elements than the beamformer has channels, in order to provide dynamic selection and beamforming control of multi-row apertures. The multiplexer allows the active aperture to be scanned along at least one axis of the array and allows the shape of the active aperture to be varied electronically. The multiplexer supports transmit and receive apertures appropriate for synthetic aperture beamforming. In addition, the multiplexer contains relatively few switches, resulting in economy of cost and size. To minimize signal attenuation, the multiplexer is designed to never impose two or more switches in series along any signal path between a beamformer channel and a transducer element.

According to a preferred embodiment of the invention, a multiplexer for a single-row or multi-row array transducer is designed so that each system beamformer channel may be coupled to a single transducer element for near-field imaging and to a pair of adjacent transducer elements for far-field imaging. In particular, the multiplexer couples system beamformer channels to transducer array elements so that connections can be made at a fine pitch, for fine control of time delays in the near-field, and at a coarse pitch, to maximize the active aperture in the far-field. The goal is high-resolution, low-f-number imaging with good sensitivity at all ranges, especially near to, and far from, the transducer.

The multiplexer also allows the active aperture to be scanned along at least one axis of the array and allows the shape of the active aperture to be varied electronically. The multiplexer supports transmit and receive apertures appropriate for synthetic aperture beamforming. For economy of cost and size, the multiplexer contains relatively few switches. To minimize signal attenuation, the multiplexer never imposes two or more switches in series along any signal path between a beamformer channel and a transducer element. Preferably, the multiplexer has a modular construction so that multiplexers appropriate for transducer arrays with different numbers of rows and columns of elements can be easily assembled from a standard set of parts.

BRIEF DESCRIPTION OF THE DRAWINGS

FIG. 4 is a schematic showing of a 6-row by 24-column transducer array with electrical connections to a 16-channel beamformer for 1.25D and 1.5D imaging in accordance with one preferred embodiment of the invention.

FIGS. 5–8 are schematic showings of the multiplexer configurations used with the array depicted in FIG. 4 for near-field 1.25D imaging (FIG. 5); far-field 1.25D imaging (FIG. 6); near-field 1.5D beamforming and 1:3 synthetic aperture imaging (FIG. 7); and far-field 1.5D beamforming and 1:2 synthetic aperture imaging (FIG. 8).

FIG. 9 is a schematic showing of a 6-row by 24-column transducer array with electrical connections to a 32-channel beamformer for 1.25D and 1.75D imaging in accordance with another preferred embodiment of the invention.

FIG. 10 is a schematic showing of the multiplexer configuration used with the array depicted in FIG. 9 for 1.25D imaging.

FIG. 11 is a schematic showing of exemplary apertures used with the array depicted in FIG. 9 for near-field 1.75D imaging.

FIG. 12 is a schematic showing of exemplary apertures used with the array depicted in FIG. 9 for far-field 1.75D imaging.

FIG. 13 is a schematic showing of the multiplexer configuration used with the array depicted in FIG. 9 for 1.75D imaging and 1:4 synthetic aperture imaging.

DETAILED DESCRIPTION OF THE PREFERRED EMBODIMENTS

Figure 1:
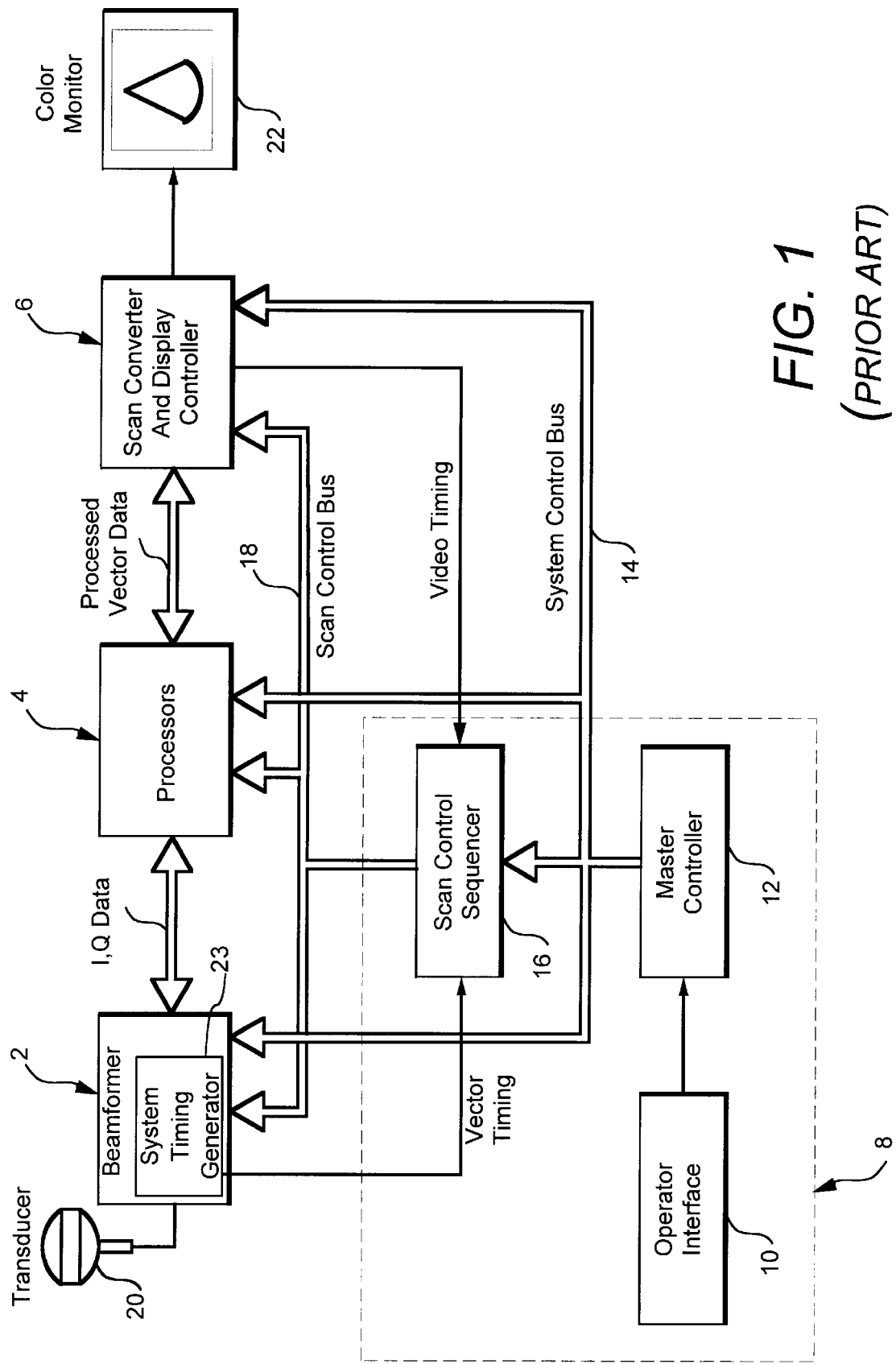
FIG. 1 is a block diagram of an ultrasound imaging system in which the present invention is incorporated.

FIG. 1 depicts an ultrasound imaging system having four main subsystems: a beamformer 2, processors 4 (including a separate processor for each different mode), a scan converter/ display controller 6 and a kernel 8. System control is centered in the kernel, which accepts operator inputs through an operator interface 10 and in turn controls the various subsystems. A master controller 12 performs system level control functions by accepting inputs from the operator via the operator interface 10 as well as system status changes (e.g., mode changes) and making appropriate system changes either directly or via the scan controller. A system control bus 14 provides the interface from the master controller to the subsystems. A scan control sequencer 16 provides real-time (acoustic vector rate) control inputs to beamformer 2, a system timing generator 23, processors 4 and scan converter 6. The scan control sequencer is programmed by the host with the vector sequences and synchronization options for acoustic frame acquisitions. The scan converter broadcasts the vector parameters defined by the host to the subsystems via scan control bus 18.

The main data path begins with analog RF input signals to beamformer 2 from transducer 20. Beamformer 2 supplies data to a processor 4, where the data are processed according to the acquisition mode. The processed data are supplied as processed vector (beam) data to scan converter/display controller 6 which accepts the processed vector data and supplies the video display signals for the image to a color monitor 22.

Figure 2:
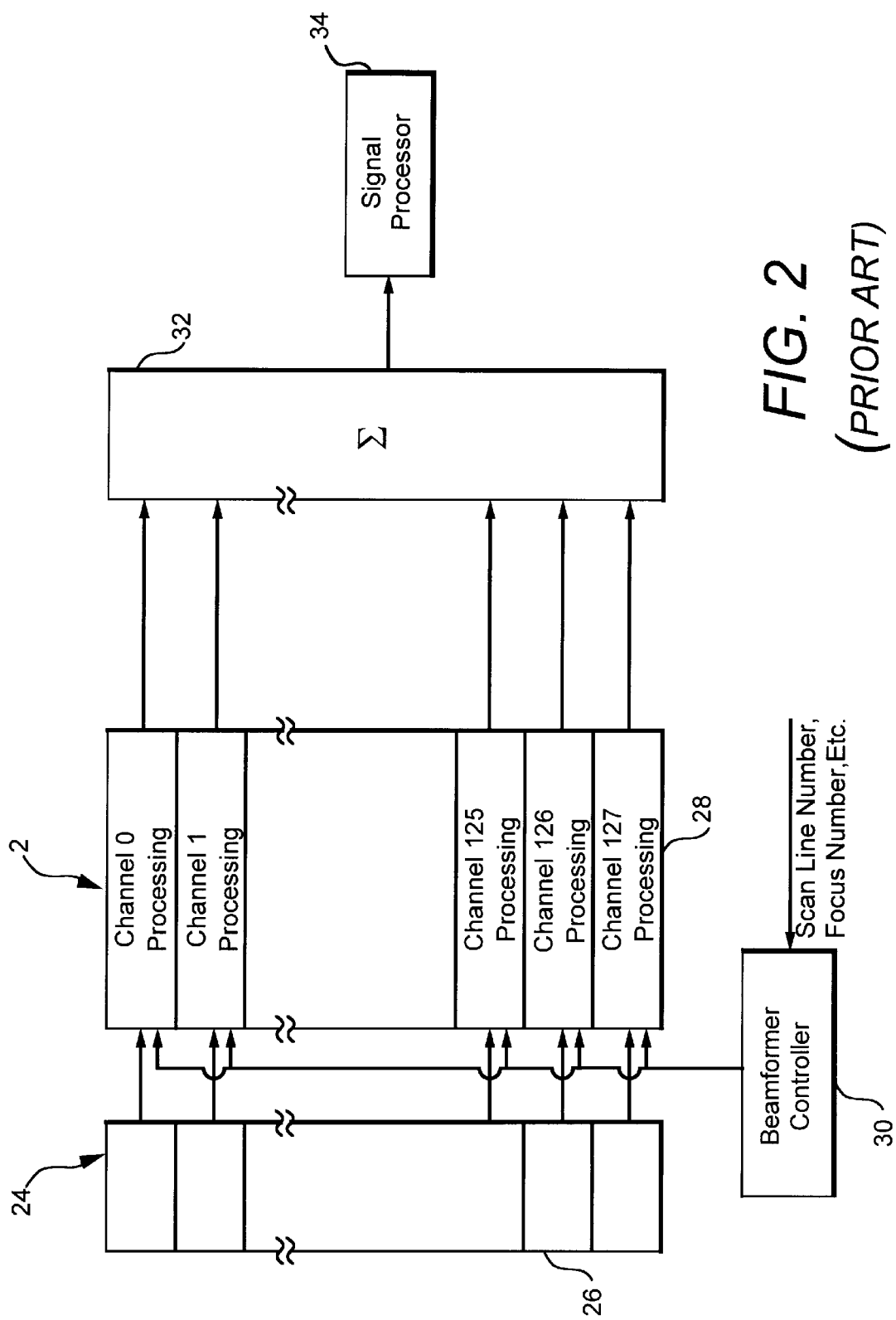
FIG. 2 is a block diagram of a typical 128-channel beamformer in a conventional ultrasound imaging system.

FIG. 2 shows a conventional ultrasound imaging system as including a transducer array 24 comprised of a plurality of separately driven transducer elements 26, each of which produces a burst of ultrasonic energy when energized by a pulsed waveform produced by a transmitter (not shown). The ultrasonic energy reflected back to transducer array 24 from an object under study is converted to an electrical signal by each receiving transducer element 26 and applied separately to beamformer 2.

Echo signals produced by each burst of ultrasonic energy reflect from objects located at successive ranges along the ultrasonic beam. The echo signals are sensed separately by each transducer element 26 and the magnitude of the echo signal at a particular point in time represents the amount of reflection occurring at a specific range. Due to differences in the propagation paths between an ultrasound-scattering sample volume and each transducer element 26, however, these echo signals will not be detected simultaneously and their amplitudes will not be equal. Beamformer 2 amplifies the separate echo signals, imparts the proper time delay to each, and sums them to provide a single echo signal which accurately indicates the total ultrasonic energy reflected from the sample volume. Each beamformer channel 28 receives the analog echo signal from a respective transducer element 26.

To simultaneously sum the electrical signals produced by the echoes impinging on each transducer element 26, time delays are introduced into each separate beamformer channel 28 by a beamformer controller 30. The beam time delays for reception are the same delays as the transmission delays. However, the time delay of each beamformer channel is continuously changing during reception of the echo to provide dynamic focusing of the received beam at the range from which the echo signal emanates. The beamformer channels also have circuitry (not shown) for apodizing and filtering the received pulses.

The signals entering a summer 32 are delayed so that when they are summed with delayed signals from each of the other beamformer channels 28, the summed signals indicate the magnitude and phase of the echo signal reflected from a sample volume located along the steered beam. A signal processor or detector 34 converts the received signal to display data which, in the B-mode (gray-scale), is the envelope of the signal with some additional processing such as edge enhancement and logarithmic compression. Scan converter 6 (FIG. 1) receives the display data from detector 34 and converts the data into the desired image for display. In particular, scan converter 6 converts the acoustic image data from polar coordinate (R—θ) sector format or Cartesian coordinate linear array format to appropriately scaled Cartesian coordinate display pixel data at the video rate. These scan-converted acoustic data are then provided for display on display monitor 22, which images the time-varying amplitude of the envelope of the signal as a gray scale.

Figure 3:
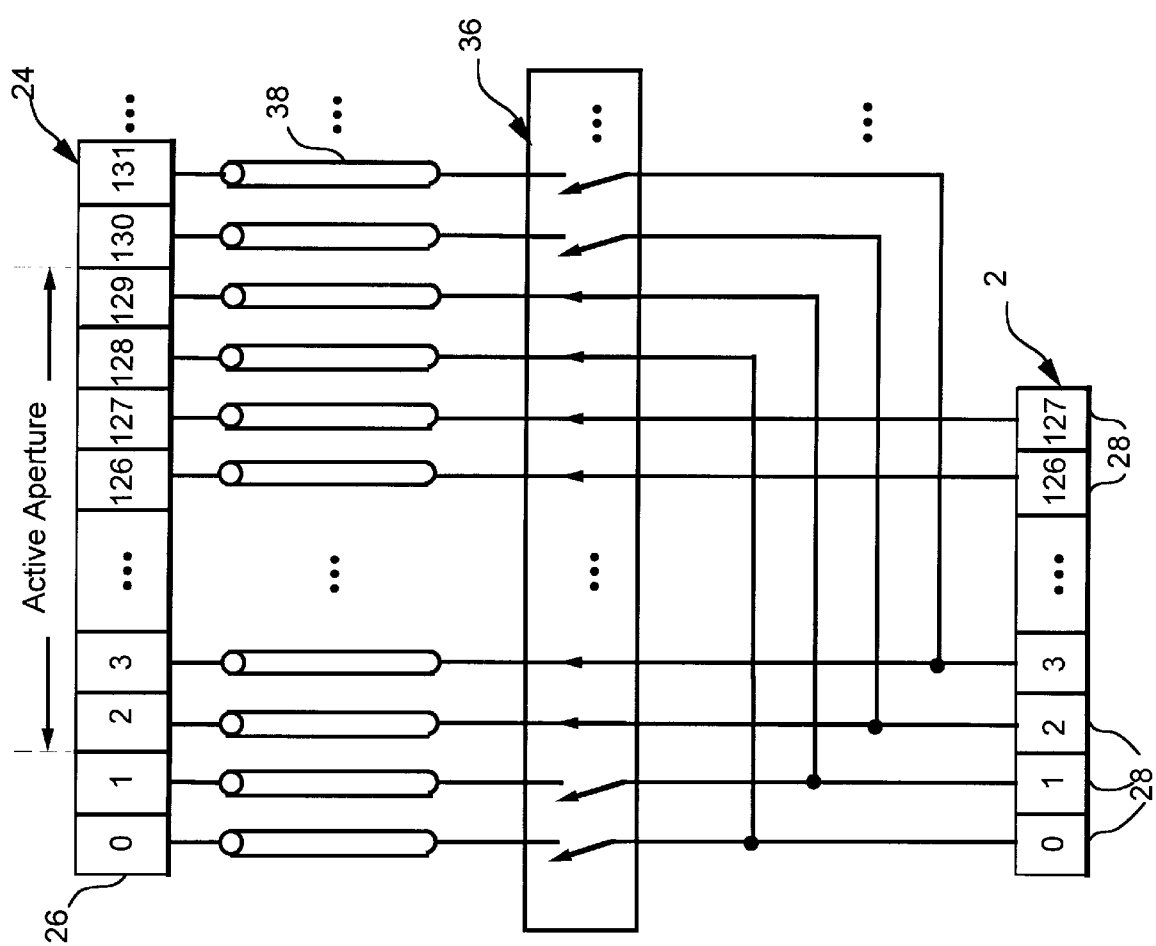
FIG. 3 is a schematic illustration of a conventional arrangement in which a multiplexer is coupled between a set of beamformer channels and a 1D transducer array having a number of elements greater than the number of beamformer channels.

A typical 1D linear or convex transducer array and multiplexer is shown schematically in FIG. 3. Beamformer 2 (FIG. 1) has 128 beamformer channels, but transducer array 24 has significantly more elements (typically 192 to 256). A multiplexer 36 allows any set of up to 128 contiguous transducer elements 26 to be simultaneously coupled to beamformer channels 28 via coaxial cables 38. By closing switches coupled to transducer elements 0 through 127, beamformer 2 is coupled to the left end of the transducer array and focused beams of ultrasound energy may be transmitted and received to acquire data for the corresponding edge of the image. As the point of origin of successive ultrasound beams steps along transducer array 24 to the right, it becomes advantageous to shift the active aperture so that the origin of the ultrasound beam is centered within the active aperture. To shift the aperture from the extreme left end of the array by one element toward the right, the multiplexer switch coupled to element 0 is opened and the switch coupled to element 128 is closed. This shifts beamformer channel 0 from the left end to the right end of the active aperture, while leaving all other channels and elements connected as before. The time delays and other beamforming parameters are changed by the software to correspond to the new multiplexer state and one or more additional image vectors are acquired. The aperture is then stepped further to the right by opening the switch coupled to element 1 and closing the switch coupled to element 129, leaving multiplexer 36 in the state shown in FIG. 3. In this manner the active aperture can be stepped sequentially from one end of transducer array 24 to the other. Alternatively, the same multiplexer hardware may be used to scan the active aperture more rapidly across the array by switching several transducer elements per step. In some imaging modes, successive apertures may be selected non-sequentially, jumping back and forth between the left and right ends of the transducer array.

Figure 8:
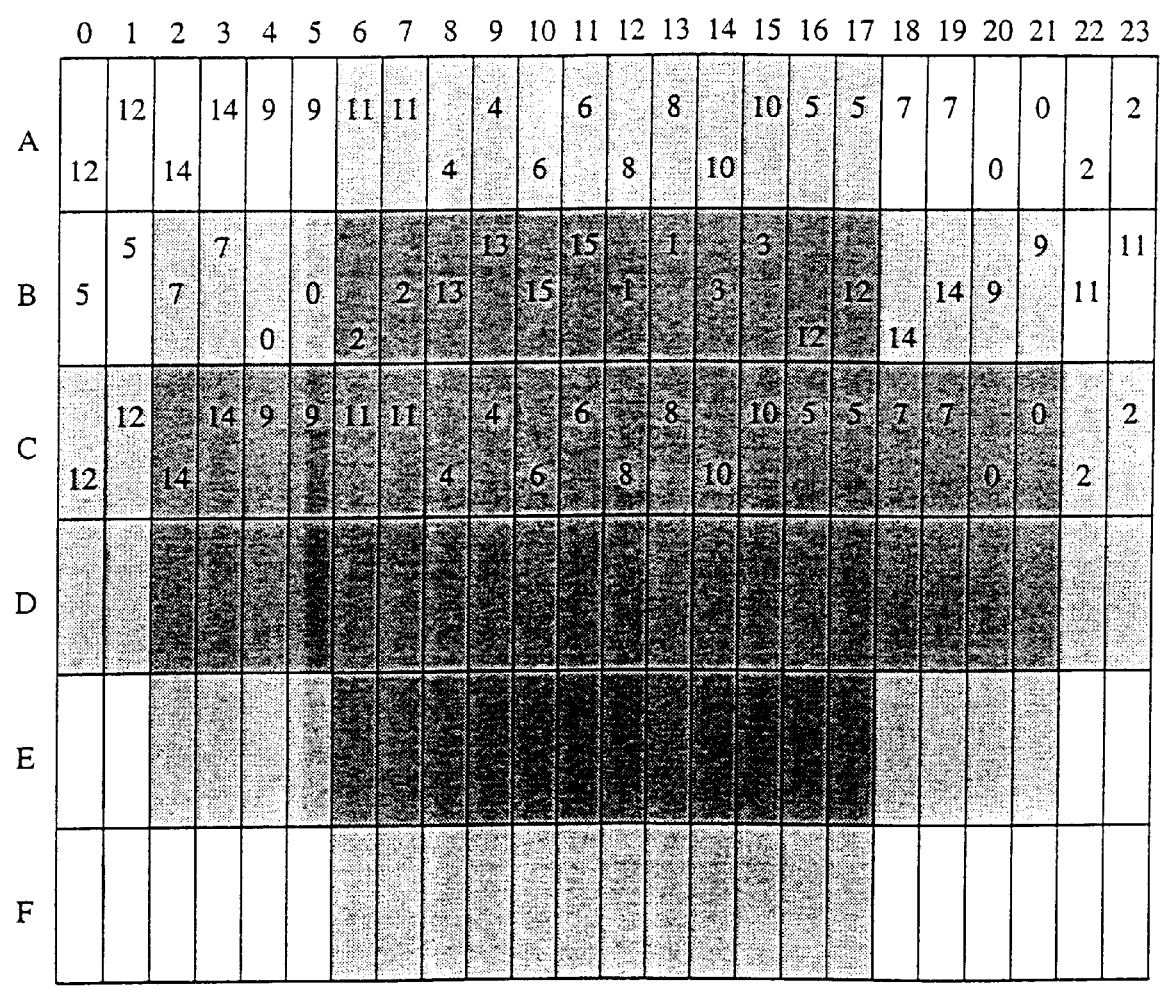

A multiplexer for 1.25D and 1.5D beamforming with a 6-row by 24-column transducer array and a 16-channel system beamformer is functionally illustrated in FIGS. 4–8. The letters (A–F) and numbers (0–23) around the perimeter label the rows and columns, respectively, of the array. The numbers within the matrix identify the beamformer channels (0–15) which are coupled, via multiplexer switches, to each transducer element. This array is not steered in elevation, so all beamforming is symmetric about the elevation centerline and consequently all transducer elements are coupled in pairs, with each pair of elements being symmetric about the horizontal centerline of the array. All apertures can be scanned across the array in azimuth. The 1.5D apertures in FIGS. 7 and 8 are two examples of the large set of aperture shapes which can be achieved with this wiring and multiplexer configuration.

For a single-row 1D transducer array, the multiplexer configuration of row C of FIGS. 4–6 provides the usual fine-pitch aperture (see FIG. 5) of up to N elements which can be scanned across the array in azimuth and a paired-element aperture (see FIG. 6) which includes all elements in the array.

Multiplexer configurations for 1.25D imaging, in which the elevation aperture is variable but elevation beamforming is static (performed by a fixed lens or static delay lines) and all system channels are used for azimuthal beamforming, are shown in FIGS. 5 and 6. For imaging near the transducer (i.e., near-field), where fine sampling of the aperture is important for accurate beamforming and the width of the aperture is f-number limited, the multiplexer configuration of FIG. 5 is used. In each column of the array, all elements are coupled to the same system beamformer channel. The width of the active aperture (shaded) is limited by the number of beamformer channels (here, 16), or may be increased M-fold if 1:M synthetic aperture imaging is used. The height of the active aperture may be as small as the central two rows or as large as the full height of the array. The shape of the aperture may be rectangular, as shown, or switches coupled to some elements in the outer rows may be left open to achieve a smaller aperture of arbitrary shape (typically convex, approximately elliptical). At greater depths (i.e., far-field), where the beamforming time delays vary less rapidly across the face of the array and achieving a low-f-number aperture requires more transducer elements than the system has beamformer channels, the multiplexer configuration of FIG. 6 can be used. For maximum sensitivity and resolution, the entire aperture is active. Since the number of transducer elements in azimuth exceeds the number of system beamformer channels, some channels are coupled to two adjacent elements. The time delays required for focusing vary quadratically with distance from the beam center, so the paired elements are in the center of the aperture and the one-channel-per-element configuration is preserved at the edges of the aperture, where the errors introduced by pairing elements would be the greatest. Channel-to-element assignments in the center of the aperture are not sequential, but are chosen to minimize the number of multiplexer switches required.

For 1.5D imaging, elevation beamforming remains symmetric (no steering), but becomes dynamic (the aperture is electronically focused at each depth). Separate beamformer channels are therefore needed for each pair of rows in the array, and the active aperture becomes channel-limited at much shallower depths. The one-channel-per-element multiplexer configuration of FIG. 7 is used for transmit and receive over a distance near the transducer and, if image quality is of greater concern than frame rate, may be used for synthetic aperture receive beamforming at greater depths. The inner aperture (darkest shading) is used alone for transmit and near-field receive. In the mid-field, the surrounding apertures (lighter shading) and 1:2 or 1:3 synthetic aperture receive beamforming may be used to maintain a low f-number, sharp focus and high resolution. The paired-element multiplexer configuration of FIG. 8 provides a larger active aperture for greater sensitivity and resolution at higher frame rates in the mid-field and far-field of the image. FIG. 8 shows the multiplexer configuration for far-field 1.5D beamforming and 1:2 synthetic aperture imaging. For maximum sensitivity and resolution, elements are paired in azimuth. The channel-to-element assignments, while not sequential, are consistent with Rules I and II of U.S. Pat. No. 5,897,501. The inner aperture (dark shading) is used for transmit and mid-field or high-frame-rate receive. In the far-field, the surrounding aperture (light shading) and 1:2 synthetic aperture imaging may be used to maintain a low f-number, sharp focus, and high resolution.

For optimum imaging performance, it may be desirable to use a 1.25D aperture (FIG. 5 or 6) or a paired-element 1.5D aperture (FIG. 8) on transmit and a one-element-per-channel 1.5D synthetic aperture (FIG. 7) on receive. The transmit aperture, with two or more elements coupled to each channel, may have less than optimal beam control, but can deliver significantly greater acoustic power for enhanced penetration and signal-to-noise ratio than a small, N-element 1.5D aperture. When receiving, 1:M synthetic aperture processing allows the full sensitivity, resolution and beamforming accuracy of an M×N-element 1.5D aperture to be achieved. For this mode of operation, a multiplexer which supports single-element and paired-element 1.25D and 1.5D operation and can switch quickly between various configurations is essential.

With reference to the design rules disclosed in U.S. Pat. No. 5,897,501, the paired channel-to-element assignments in FIGS. 6 and 8 are consistent with Rules I, II and IV. The multiplexer is designed to support, with a minimum of switches, both paired and unpaired connections from transducer elements to beamformer channels. Consequently, the paired connections are not sequential, but occur in channel order 0, 2, 13, 15, 1, 3, 12, 14, 9, 11, 4, 6, 8, 10, 5, 7 (equivalent results can be achieved with other orderings). The cycle length for all rows is 16 channels, or 32 paired elements, which exceeds the width of the illustrated arrays. In the 1.5D configuration of FIG. 8, channel assignments in row B are offset from those in rows A and C by half the cycle length, i.e., 8 channels. This allows different rows to be paired when deciding the size and shape of the active apertures. The central, dark-shaded, 16-channel aperture in FIG. 8 pairs rows B and C. The shape of this aperture can be anything from 0 elements in row B and 32 elements in row C to 16 elements in each row (using more elements in row B than C is also possible, but would have a detrimental effect on the acoustic beam quality). For the light-shaded 1:2 aperture, rows A and B are paired and row C is fixed at 32 elements (here, limited to 24 elements by the size of the array). These pairings, and the resulting possible 1.5D aperture shapes, are summarized in Table 2. For completeness, Table 1 describes the 1.5D aperture shapes achievable with the unpaired multiplexer configuration of FIG. 7.

TABLE 1

| FIG. 7 | Elements per Row | | | FIG. 7 (N=16) | Total Elements | Synthetic Aperture |
|---|---|---|---|---|---|---|
| | A+F | B+E | C+D | | | |
| Dark Gray | 0 | m | N−m | m=6 | N | |
| Med. Gray | 1 | N−l | N | l=4 | 2N | 1:2 |
| Light Gray | N−k | N | N+k | k=4 | 3N | 1:3 |

TABLE 2

| FIG. 8 | Elements per Row | | | FIG. 8 N=16 | Total Elements | Synthetic Aperture |
|---|---|---|---|---|---|---|
| | A+F | B+E | C+D | | | |
| Dark Gray | 0 | 2m | 2(N−m) | m=6 | 2N | |
| Light Gray | 2l | 2(N−l) | 2N | l=6 | 4N | 1:2 |

It will be understood that, while FIGS. 4–8 show a 6-row by 24-column transducer array and 16-channel beamformer, the same design principles apply to 64- or 128-channel beamformers and arrays with 6, 8, or more rows and 128, 192, or more columns of elements.

A multiplexer configuration for 1.25D and 1.75D beamforming with a 6-row by 24-column transducer array and a 32-channel system beamformer is illustrated in FIGS. 9–13.

Not shown in FIGS. 9–13, but also possible with this multiplexer configuration, are single-row apertures extending over the full width of the array. Since this array does not have hard-wired symmetry in elevation, the multiplexer is designed so that all apertures may be scanned across the array in both azimuth (horizontal) and elevation (vertical). The letters (A–F) and numbers (0–23) around the perimeter label the rows and columns of the array, respectively. The numbers within the matrix identify the beamformer channels (0–31) which are connected, via multiplexer switches, to each transducer element. Each transducer element is independently coupled to one or two multiplexer switches; there is no constraint that the active apertures or beamforming be symmetric about the horizontal centerline of the array. FIG. 9 provides a complete list of all possible channel connections for all elements.

With reference to the design rules of U.S. Pat. No. 5,897,501, the channel-to-element assignments in FIG. 9 increase from left to right in all rows (Rule I). The primary cycle length is 32, equal to the number of system beamformer channels. Secondary channel connections to some of the elements in each row are offset from the primary channel connections by half the cycle length (Rule IV), allowing any of rows A, D and E to be paired together (Rule II), as well as any of rows B, C and F. Channel assignments in rows A, D and E are offset from those in rows B, C and F by one quarter of the cycle length (Rule ll), allowing the creation of contiguous 4-row, 32-element, 1.75D apertures which can be scanned in both azimuth and elevation (see FIG. 11).

FIG. 10 shows a multiplexer configuration for 1.25D imaging. In each column of the array, all elements are connected to one or the other of a pair of system channels which are programmed with identical beamforming parameters. Because of this pairing, the maximum number of elements in any row of the active aperture (shaded) is half the number of system channels (here, N/2=16). This active width may be increased M-fold if 1:M synthetic aperture imaging is used. The height of the active aperture may be as small as one row or as large as the full height of the array. The shape of the aperture may be rectangular, as shown, or switches connected to some elements in the outer rows may be left open to achieve a smaller aperture of arbitrary shape (typically convex, approximately elliptical).

FIG. 11 shows examples of apertures for near-field 1.75D imaging. Possible apertures have m, N/2−1), (N/2−m), and l elements per row. Here, N=32, m=l=8 for the dark-shaded aperture, and m=l=5 for the light-shaded aperture. Since there is no hard-wired symmetry in elevation, all apertures may be scanned in both azimuth (horizontal) and elevation (vertical). Within each aperture, only those multiplexer switches which are closed are shown.

FIG. 12 shows examples of apertures for far-field 1.75D imaging. Elements in rows B and C, and in rows D and E, are connected together, allowing the full 6-row elevation to be used for maximum penetration and resolution in the far-field. Possible apertures have m, (N/2−m), (N/2−m), (N/2−l), (N/2−l), and l elements per row. Here, N=32, m=l=8 for the light-shaded aperture, and m=l=6 for the dark-shaded aperture. All apertures may be scanned in azimuth (horizontal). Within each aperture, only those multiplexer switches which are closed are shown.

FIG. 13 shows a multiplexer configuration for 1.75D beamforming and 1:4 synthetic aperture imaging. The inner aperture (dark shading) is used alone in the near-field. In the mid- and far-fields, the surrounding apertures (/// hatching; light shading; \\\ hatching) and 1:2 to 1:4 synthetic aperture imaging may be used to maintain a low f-number, sharp focus and high resolution.

Among the changes from the multiplexer shown in FIGS. 7–10 of U.S. Pat. No. 5,897,501 to the multiplexer shown in FIGS. 9–13 here are that the assignment of channels to rows C and D has been swapped and switches have been added to connect all elements of rows B and E to two system channels each. Swapping rows C and D destroys the ability to create 3-row by (N/2=) 16-element 1.5D apertures (primarily useful in the near-field), but, with the additional switches, allows the use of 6-row, paired-element 1.75D apertures (FIG. 12) for better transmit and high-frame-rate performance in the far-field.

Table 3 summarizes the 1.75D aperture shapes shown in FIG. 13. It will be understood that, while FIGS. 9–13 show a 6-row by 24-column transducer array and 32-channel beamformer, the same design principles apply to 64- or 128-channel beamformers and arrays with 6, 8 or more rows and 128, 192 or more columns of elements.

TABLE 3

| FIG. 13 | Elements per Row | | | FIG. 13 (N=32) | Total Elements | Synthetic Aperture |
| --- | --- | --- | --- | --- | --- | --- |
| | A,F | B,E | C,D | | | |
| Dark Gray | 0 | m | N/2−m | m=6 | N | |
| /// | 1 | N/2−1 | N/2 | l=6 | 2N | 1:2 |
| Light Gray | N/2−k | N/2 | N/2+k | k=4 | 3N | 1:3 |
| \\\ | N/2 | N/2+j | N−j | j=8 | 4N | 1:4 |

The multiplexer configuration of FIG. 9 can be implemented with the modular hardware shown in FIGS. 7–10 of U.S. Pat. No. 5,897,501. The multiplexer configuration of FIG. 4, which is capable of connecting each system channel to pairs of elements which are adjacent in azimuth, requires the more complex multiplexer boards shown in FIGS. 16 and 17 and a backplane with the symmetry shown in FIG. 15.

The multiplexer configuration of FIG. 9 supports 1.25D and 1.75D beamforming, elements paired in elevation for increased transmit power, 1:M synthetic aperture imaging, and apertures which can be scanned in azimuth and elevation. The multiplexer configuration of FIGS. 4 and 15–17 provides means for increasing the active aperture of a probe by connecting adjacent elements together in azimuth.

The modular hardware design which makes the above-described multiplexer configuration of FIG. 4 possible is shown in FIGS. 14–17. The hardware shown is for a 128-channel beamformer.

Figure 14:
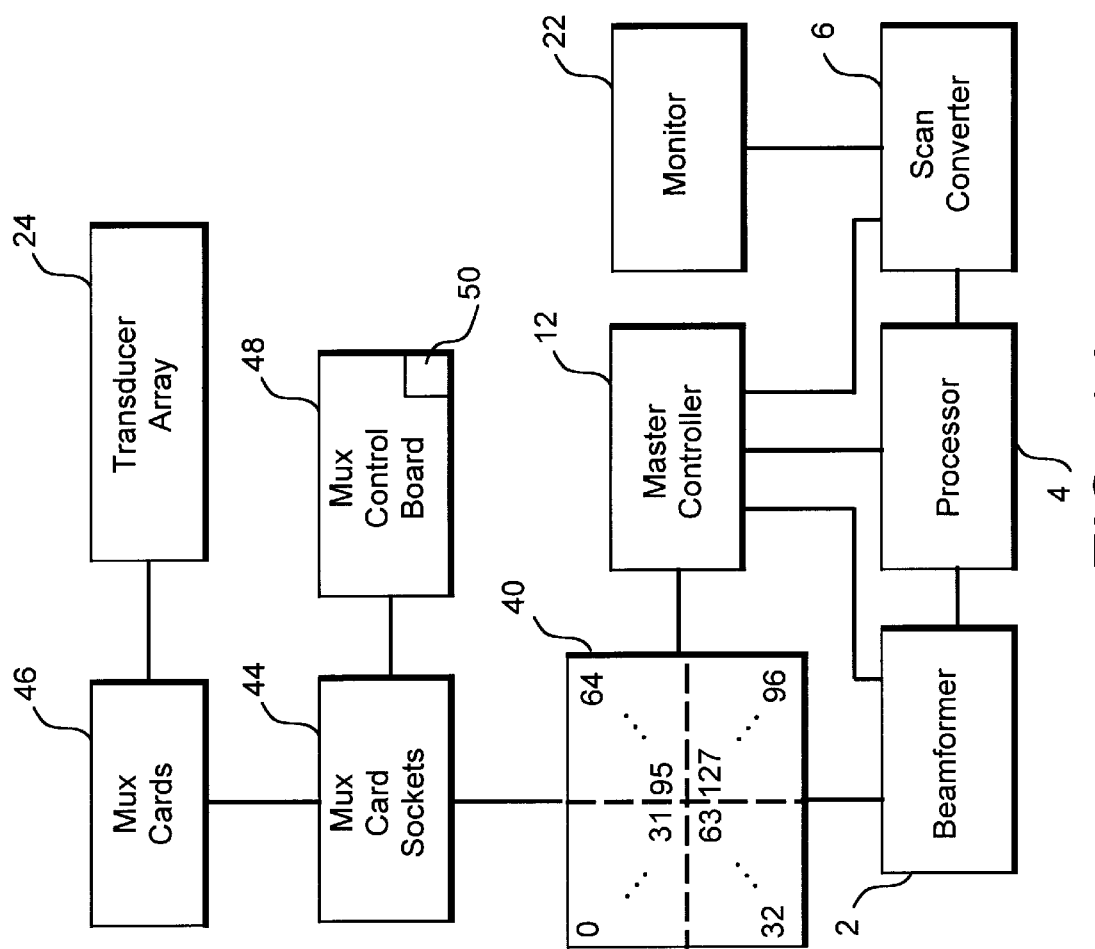
FIG. 14 is a block diagram showing part of an ultrasound imaging system incorporating a modular multiplexer in accordance with a preferred embodiment of the invention.

As seen in FIG. 14, a system console connector 40 is divided into quadrants, with connections for the 128 channels of beamformer 2 distributed among the quadrants as shown. The multiplexer is controlled by a parameter called MUX State, which is transmitted by master controller 12 to control lines on system console connector 40. The MUX State parameter is generated in accordance with a transducer multiplexer control program stored in the master controller.

Figure 15:
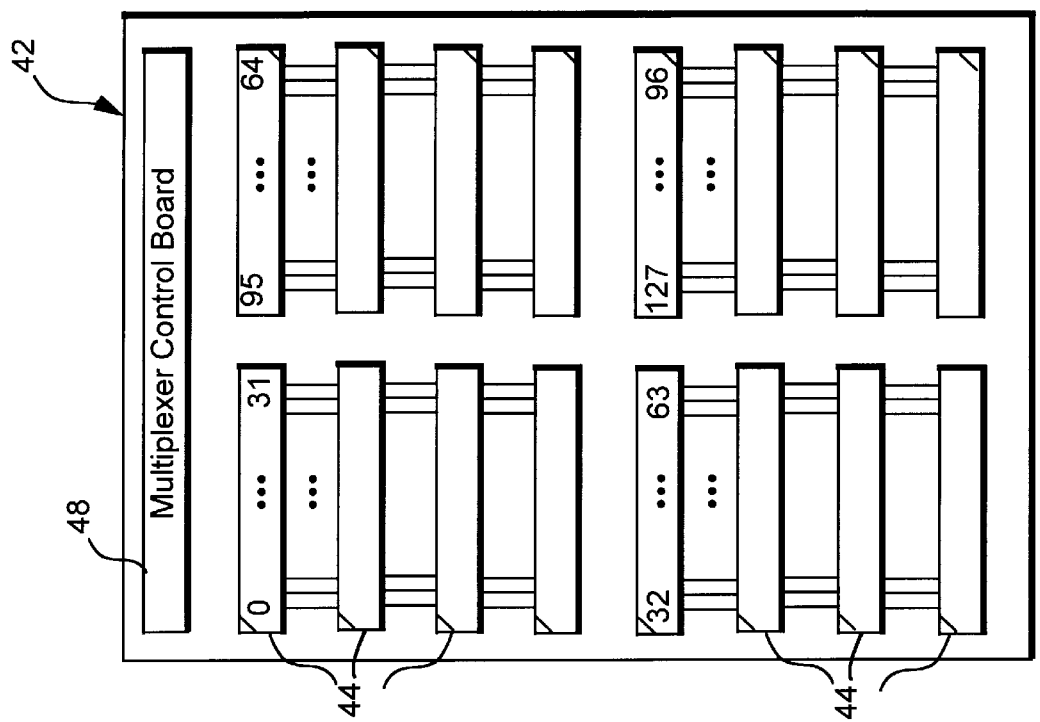
FIG. 15 is a schematic showing of the backplane or motherboard shown in FIG. 14.

The multiplexer backplane or motherboard 42, shown in FIG. 15, mounts on system console connector 40. Each quadrant of the backplane contains two or more (here, four) identical sockets 44 for multiplexer cards 46 (FIG. 14), connected together and to the corresponding quadrant of console connector 40 in parallel. Orientation keys for the multiplexer card sockets are shown as dark triangles. The assignment of system channels to quadrants of the console connector and multiplexer backplane and the locations of the multiplexer card sockets on the backplane are arranged so that sockets which are aligned end-to-end are connected to system channels which differ by half the multiplexer cycle length (here, by 128/2=64). Multiplexer control board 48 is coupled to control lines on console connector 40 and separate (not paralleled) control lines to each multiplexer card socket 44. The control board receives a concise MUX State command from the master controller and uses data stored in an on-board memory 50 (i.e., a read only memory (ROM) or electronically erasable programmable read only memory (EEPROM)) to set every switch on every multiplexer card 46 to the open or closed position required for the commanded multiplexer state.

Figure 16:
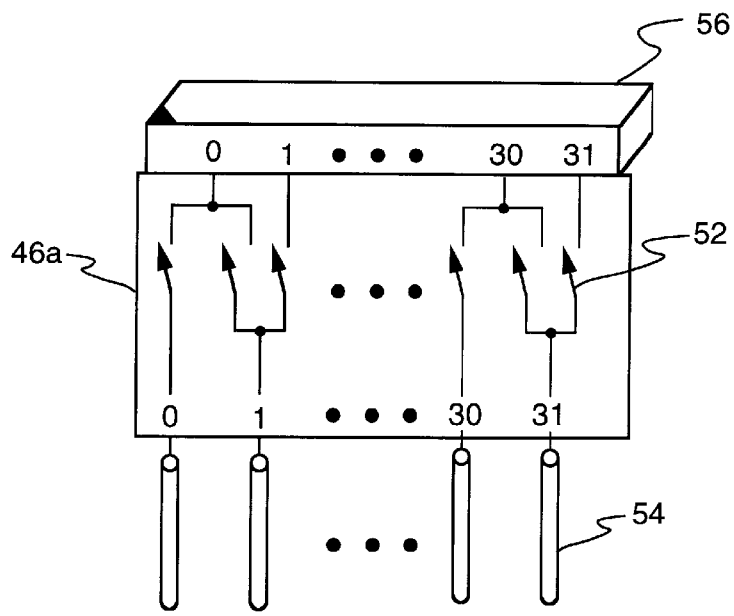
FIGS. 16 and 17 are schematic showings of different preferred embodiments of multiplexer cards which plug into sockets on the multiplexer motherboard shown in FIG. 15.
Figure 17:
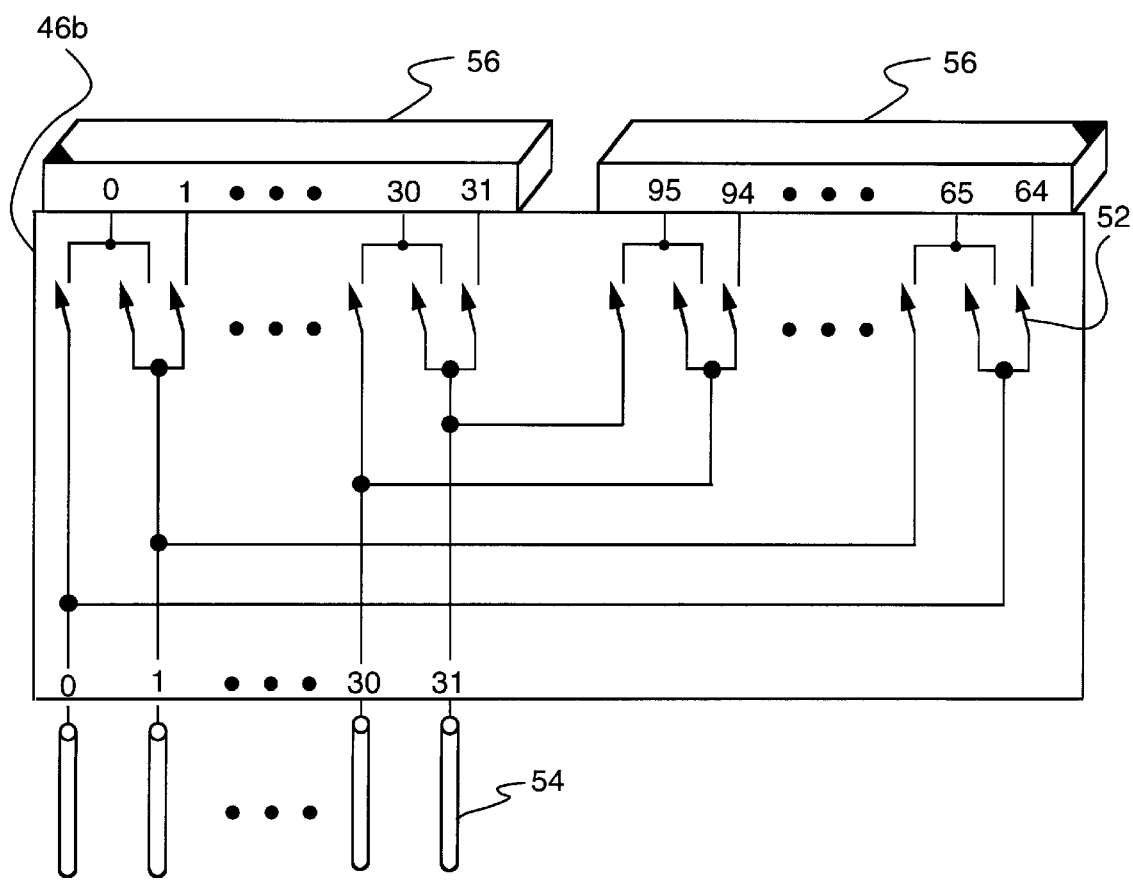

FIGS. 16 and 17 are schematic diagrams showing different preferred embodiments of the multiplexer cards which plug into the sockets on the multiplexer backplane shown in FIG. 15. Each card contains a set of individually controllable switches 52 which can connect coaxial leads 54 from transducer elements (lower edge of card) to specific system beamformer channels via a connector 56 (upper edge of board) which plugs into a socket on the multiplexer backplane. Orientation keys in the connectors are shown as dark triangles. FIG. 16 shows a single-width multiplexer card 46a for connecting 32 coaxial leads to 32 system channels. Even-numbered transducer elements connect to one system channel each. Odd-numbered elements connect to either of two system channels. FIG. 17 shows a double-width multiplexer card 46b for connecting 32 coaxial leads to 64 system channels. Each transducer element can connect to any of three system channels. The connectors on this card and on the backplane are arranged so that the card can be inserted into the backplane in either of two orientations. This allows all of the element-to-channel connections in a 128-channel version of the configuration shown in FIG. 4 to be accomplished with only the two types of boards shown in FIGS. 16 and 17.

While described with reference to medical ultrasound, the concepts disclosed herein may also be applicable to non-destructive testing and sonar.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. Apparatus for multiplexing transducers, comprising:
   a transducer array comprising first and second rows of transducer elements, each of said first and second rows comprising a respective multiplicity of said transducer elements;
   a beamformer comprising a multiplicity of beamformer channels numbered in sequence to form a cycle length;
   a multiplicity of switches for multiplexing imaging data between said transducer elements of said first and second rows and said beamformer channels; and
   a controller for selectively configuring said switches in response to receipt of a multiplexer state command,
   wherein beamformer channel to transducer element assignments are arranged so that in a first multiplexer state a first subset of the transducer elements in said first row and a first subset of the transducer elements in said second row can be switchably coupled to said beamformer channels in one-to-one relationship to form a part of a first aperture, and in a second multiplexer state a second subset of the transducer elements in said first row and a second subset of the transducer elements in said second row can be switchably connected to said beamformer channels in two-to-one relationship and with pairs of azimuthally adjacent transducer elements in each of said first and second rows being connected to the same respective beamformer channel to form a part of a second aperture.

2. The apparatus as defined in claim 1, wherein said beamformer channel to transducer element assignments are arranged to allow said parts of said first and second apertures to be scanned in an azimuthal direction by operation of said controller and said switches while maintaining said one-to-one correspondence between transducer elements in said part of said first aperture and said beamformer channels and maintaining said two-to-one correspondence between transducer elements in said part of said second aperture and said beamformer channels.

3. The apparatus as defined in claim 1, wherein said switches are arranged to allow each of said transducer elements in said first row to be switchably coupled by said controller to either one or two beamformer channels and each of said transducer elements in said second row to be switchably coupled by said controller to either two or three beamformer channels.

4. The apparatus as defined in claim 1, wherein said transducer array further comprises a third row of transducer elements having the same beamformer channel to transducer element assignments as the transducer elements of said first row.

5. The apparatus as defined in claim 1, wherein the beamformer channel to transducer element assignments for said second row comprise first and second sets of channel assignments which are sequential and have the same order and cycle length, but which are mutually offset by one-half the cycle length.

6. The apparatus as defined in claim 5, wherein the beamformer channel to transducer element assignments for said second row further comprise a third set of channel assignments which are non-sequential.

7. The apparatus as defined in claim 1, wherein the beamformer channel to transducer element assignments for said first row comprise a first set of channel assignments.

8. An apparatus comprising:
  a transducer array comprising first through fourth rows of transducer elements, each of said first through fourth rows comprising a respective multiplicity of said transducer elements;
  a beamformer comprising a multiplicity of beamformer channels numbered in sequence to form a cycle length;
  a multiplicity of switches for multiplexing imaging data between said transducer elements of said first through fourth rows and said beamformer channels; and
  a controller for selectively configuring said switches in response to receipt of a multiplexer state command,
  wherein beamformer channel to transducer element assignments for each of said first through fourth rows comprise first through fourth sets of sequential channel assignments which have identical order and cycle length, but which are mutually offset by one-quarter the cycle length to allow, in a first multiplexer state a respective subset of the transducer elements in each of said first through fourth rows to be switchably coupled to said beamformer channels in one-to-one relationship to form a first aperture.

9. The apparatus as defined in claim 8, wherein said beamformer channel to transducer element assignments are arranged to allow said first aperture to be scanned in an azimuthal direction by operation of said controller and said switches while maintaining said one-to-one correspondence between transducer elements in said first aperture and said beamformer channels.

10. The apparatus as defined in claim 9, wherein said transducer array further comprises fifth and sixth rows of transducer elements, and said beamformer channel to transducer element assignments for said first through sixth rows are arranged to allow said first aperture to be scanned in an elevational direction by operation of said controller and said switches while maintaining said one-to-one correspondence between transducer elements in said first aperture and said beamformer channels.

11. The apparatus as defined in claim 8, wherein in a second multiplexer state a respective subset of the transducer elements in each of said second and third rows can be switchably coupled to said beamformer channels in two-to-one relationship to form a first part of a second aperture with pairs of elevationally adjacent transducer elements in said second and third rows being coupled to respective beamformer channels of a first set of beamformer channels.

12. The apparatus as defined in claim 11, wherein said transducer array further comprises fifth and sixth rows of transducer elements and wherein in said second multiplexer state a respective subset of the transducer elements in each of said fourth and fifth rows can be switchably coupled to said beamformer channels in two-to-one relationship to form a second part of said second aperture with pairs of elevationally adjacent transducer elements in said fourth and fifth rows being coupled to respective beamformer channels of a second set of beamformer channels, said first and second sets of beamformer channels being mutually exclusive.

13. The apparatus as defined in claim 10, wherein the beamformer channel to transducer element assignments for each of said first through sixth rows each comprises first and second sets of channel assignments, said first sets of channel assignments for said second and third rows being identical, said second sets of channel assignments for said fourth and fifth rows being identical, said second set of channel assignments for said second row being the same as said first set of channel assignments for said sixth row, and said second set of channel assignments for said first row being the same as said first set of channel assignments for said fifth row.

14. A method for operating an ultrasound imaging system including a multiplicity of beamformer channels numbered in order to form a cycle length and a transducer array including first and second rows of transducer elements, comprising the steps of:
  assigning each transducer element of said first and second rows to at least one of said beamformer channels, each beamformer channel to transducer element assignment being provided by a respective connection having a switch which can be selectively controlled to be in an open state or a closed state, wherein in a first multiplexer state a first subset of the transducer elements in said first row and a first subset of the transducer elements in said second row can be switchably coupled to said beamformer channels in one-to-one relationship to form a part of a first aperture, and in a second multiplexer state a second subset of the transducer elements in said first row and a second subset of the transducer elements in said second row can be switchably coupled to said beamformer channels in two-to-one relationship with pairs of azimuthally adjacent transducer elements in each of said first and second rows being coupled to the same respective beamformer channel to form a part of a second aperture;

selectively closing a first multiplicity of switches in response to a first command indicating said first multiplexer state; and selectively closing a second multiplicity of switches in response to a second command indicating said second multiplexer state.

15. The method as defined in claim 14, wherein the beamformer channel to transducer element assignments for said first row comprises a first set of sequential channel assignments and a second set of nonsequential channel assignments, the beamformer channel to transducer element assignments for said second row comprise first and second sets of sequential channel assignments and a third set of nonsequential channel assignments, said first sets of sequential channel assignments for said first and second rows being identical, and said second set of sequential channel assignments for said second row being offset from said first sets of sequential channel assignments by one-half of said cycle length.

16. A method for operating an ultrasound imaging system including a multiplicity of beamformer channels numbered in order to form a cycle length and a transducer array including first through fourth rows of transducer elements, comprising the steps of:

assigning each transducer element of said first through fourth rows to at least one of said beamformer channels, each beamformer channel to transducer element assignment being provided by a respective connection having a switch which can be selectively controlled to be in an open state or a closed state, wherein the beamformer channel to transducer element assignments for each of said first through fourth rows respectively comprise first through fourth sets of sequential channel assignments which have identical order and cycle length, but which are mutually offset by one-quarter of the cycle length; and switchably coupling a respective subset of the transducer elements in each of said first through fourth rows to said beamformer channels in one-to-one relationship to form a first aperture.

17. The method as defined in claim 16, wherein said transducer array further includes a fifth row of transducer elements, said method further comprising the steps of:

assigning each transducer element of said fifth row to at least one of said beamformer channels, wherein the beamformer channel to transducer element assignments for said fifth row comprise a fifth set of sequential channel assignments which is identical to said first set of sequential channel assignments; and switchably coupling a respective subset of the transducer elements in each of said second through fifth rows to said beamformer channels in one-to-one relationship to scan said first aperture in an elevation direction.

18. The method as defined in claim 17, wherein said transducer array further includes a sixth row of transducer elements, said method further comprising the steps of:

assigning each transducer element of said sixth row to at least one of said beamformer channels, wherein the beamformer channel to transducer element assignments for said sixth row comprise a sixth set of sequential channel assignments which is identical to said second set of sequential channel assignments; and switchably coupling a respective subset of the transducer elements in each of said third through sixth rows to said beamformer channels in one-to-one relationship to further scan said first aperture in the elevation direction.

19. The method as defined in claim 16, wherein the beamformer channel to transducer element assignments for said second row further include a seventh set of sequential channel assignments which is identical to said third set of sequential channel assignments, said method further comprising the step of switchably coupling said transducer elements of said second and third rows to said beamformer channels in two-to-one relationship to form a first part of a second aperture with pairs of elevationally adjacent transducer elements in said second and third rows being coupled to respective beamformer channels of a first set of beamformer channels.

20. The method as defined in claim 19, wherein the beamformer channel to transducer element assignments for said fifth row further include an eighth set of sequential channel assignments which is identical to said fourth set of sequential channel assignments, further comprising the step of switchably coupling said transducer elements of said fourth and fifth rows to said beamformer channels in two-to-one relationship to form a second part of said second aperture with pairs of elevationally adjacent transducer elements in said fourth and fifth rows being coupled to respective beamformer channels of a second set of beamformer channels.

21. Apparatus for mutiplexing transducers, comprising:

a transducer array having at least one row of transducer elements;

a beamformer including a multiplicity of beamformer channels numbered in sequence to form a cycle length;

a multiplicity of switches for multiplexing imaging data between said transducer elements of said at least one row and said beamformer channels; and a controller for selectively configuring said switches in response to receipt of a multiplexer state command, wherein beamformer channel to transducer element assignments are arranged so that in a first multiplexer state a first subset of the transducer elements in said at least one row can be switchably coupled to said beamformer channels in one-to-one relationship to form a part of a first aperture, and in a second multiplexer state a second subset of the transducer elements in said at least one row can be switchably connected to said beamformer channels in two-to-one relationship and with pairs of azimuthally adjacent transducer elements in said at least one row being connected to the same respective beamformer channel to form a part of a second aperture.

* * * * *